(12) United States Patent
Nie et al.

(10) Patent No.: US 11,255,872 B2
(45) Date of Patent: Feb. 22, 2022

(54) PIEZOELECTRIC ACCELERATION SENSOR

(71) Applicant: FATRI (Xiamen) Technologies Co., Ltd., Xiamen (CN)

(72) Inventors: Yongzhong Nie, Xiamen (CN); Wenjie Liu, Xiamen (CN)

(73) Assignee: FATRI UNITED TESTING & CONTROL (QUANZHOU) TECHNOLOGIES CO., LTD., Quanzhou (CN)

( * ) Notice: Subject to any disclaimer, the term of this patent is extended or adjusted under 35 U.S.C. 154(b) by 0 days.

(21) Appl. No.: 16/887,479

(22) Filed: May 29, 2020

(65) Prior Publication Data

US 2020/0379003 A1    Dec. 3, 2020

(30) Foreign Application Priority Data

May 31, 2019 (CN) .......................... 201920819087.3

(51) Int. Cl.
 *G01P 15/09* (2006.01)
(52) U.S. Cl.
 CPC ................ *G01P 15/0922* (2013.01)
(58) Field of Classification Search
 CPC .................................................. G01P 15/0922
 See application file for complete search history.

(56) References Cited

U.S. PATENT DOCUMENTS

| | | | | |
|---|---|---|---|---|
| 3,307,054 A | * | 2/1967 | Shoor | G01P 15/0915 |
| | | | | 310/329 |
| 5,473,941 A | * | 12/1995 | Judd | G01P 1/023 |
| | | | | 73/514.34 |
| 6,513,383 B1 | * | 2/2003 | Okano | B60R 21/013 |
| | | | | 73/514.34 |
| 2020/0209278 A1 | * | 7/2020 | Nie | G01P 15/09 |

FOREIGN PATENT DOCUMENTS

CN          107219377 A  *  9/2017  .......... G01P 15/0802

* cited by examiner

*Primary Examiner* — Xin Y Zhong
(74) *Attorney, Agent, or Firm* — Law Offices of Liaoteng Wang

(57) ABSTRACT

The disclosure relates to a piezoelectric acceleration sensor. The piezoelectric acceleration sensor includes: a charge output member comprising a base, a piezoelectric element disposed on the base and a mass, wherein the base includes a supporting portion and a connecting portion disposed on the supporting portion and extending in a first direction, and the piezoelectric element and the mass are sleeved on the connecting portion; a shielding cover sleeved on the connecting portion, wherein the shielding cover is connected to the connecting portion and the supporting portion, the shielding cover forms a shielding space outside a periphery of the connecting portion and above the supporting portion, and the piezoelectric element and the mass are arranged in the shielding space; and a housing coupled with the supporting portion, wherein the housing and the supporting portion form an accommodating space for accommodating the charge output member and the shielding cover.

20 Claims, 1 Drawing Sheet

PIEZOELECTRIC ACCELERATION SENSOR

CROSS-REFERENCE TO RELATED APPLICATION

This application is based on and claims priority to Chinese Patent Application No. 201920819087.3 filed on May 31, 2019, which is incorporated herein by reference in its entirety.

FIELD

The disclosure relates to the technical field of sensor, and in particular to a piezoelectric acceleration sensor.

BACKGROUND

Piezoelectric acceleration sensor, also known as piezoelectric accelerometer, is an inertial sensor. The principle of the piezoelectric acceleration sensor is to employ the piezoelectric effect of the piezoelectric element. When the accelerometer vibrates, a force exerted on the piezoelectric element by the mass changes accordingly. When the measured vibration frequency is much lower than the natural frequency of the accelerometer, the change in force is proportional to the measured acceleration.

Piezoelectric acceleration sensors are widely used in fault detection systems. External signals easily affect the measurement accuracy of piezoelectric acceleration sensors. An urgent problem to be solved is how to reduce the interference of external signals and improve the measurement accuracy.

SUMMARY

Embodiments of the disclosure provides a piezoelectric acceleration sensor, which aims to reduce the interference of external signals on the measurement accuracy.

A first embodiment of the disclosure provides a piezoelectric acceleration sensor, including: a charge output member including a base, a piezoelectric element disposed on the base and a mass, wherein the base includes a supporting portion and a connecting portion disposed on the supporting portion and extending in a first direction, and the piezoelectric element and the mass are sleeved on the connecting portion; a shielding cover sleeved on the connecting portion, wherein the shielding cover is connected to the connecting portion and the supporting portion, the shielding cover forms a shielding space outside a periphery of the connecting portion and above the supporting portion, and the piezoelectric element and the mass are arranged in the shielding space; and a housing coupled with the supporting portion, wherein the housing and the supporting portion form an accommodating space for accommodating the charge output member and the shielding cover.

According to an aspect of embodiments of the disclosure, the shielding cover includes a shield, wherein the shield is connected to the connecting portion and the supporting portion, and the shielding space is formed and enclosed by the shield, a part of the connecting portion and a part of the supporting portion.

According to an aspect of embodiments of the disclosure, the piezoelectric acceleration sensor further includes an insulating layer, which is attached to and disposed on the periphery of the connecting portion and the supporting portion; the shielding cover includes a shield and a shield support connected with each other to form the shielding space, the shield support is sleeved on the connecting portion, the shield support is connected to the connecting portion and the supporting portion through the insulating layer, and the shield is coupled with the shield support.

According to an aspect of embodiments of the disclosure, the insulating layer has a size larger than or equal to a size of a portion of the shield support that is connected to the connecting portion and the supporting portion, and the shield support is completely attached to the insulating layer.

According to an aspect of embodiments of the disclosure, the piezoelectric acceleration sensor further includes an output assembly, which is disposed outside the housing and is electrically connected to the charge output member, wherein the output assembly includes a connector formed at a lateral side of the housing and a cable electrically connected to the connector. The connector and the housing are integrally formed, and the cable is a noise reducing cable.

According to an aspect of embodiments of the disclosure, the connector and the cable are connected through a sleeve, the connector is connected to one end of the sleeve, and the cable is crimped onto the other end of the sleeve.

According to an aspect of embodiments of the disclosure, an injection molded member is disposed at an outer surface of the sleeve onto which the cable is crimped, and the injection molded member is disposed to surround a part of the sleeve and a part of the cable.

According to an aspect of embodiments of the disclosure, the piezoelectric acceleration sensor further includes a circuit board, which is disposed at a side of the piezoelectric element away from the supporting portion to surround the connecting portion, wherein the circuit board is arranged in the shielding space and is electrically connected to the piezoelectric element.

According to an aspect of embodiments of the disclosure, the base includes a mounting hole that extends through the connecting portion and the supporting portion in the first direction.

According to an aspect of embodiments of the disclosure, the housing includes a cylindrical body and an upper cover, the cylindrical body is sleeved on the connecting portion and coupled with the supporting portion, the upper cover includes a through hole extending through the upper cover, the through hole is coaxial with the mounting hole, the through hole has a diameter larger than or equal to that of the mounting hole, and the upper cover is coupled at the cylindrical body and the connecting portion. The through hole is a stepped hole.

In the embodiments of the disclosure, the housing is coupled to the supporting portion of the base, and the housing and the supporting portion form the accommodating space, which can play a certain role in shielding external signals; the shielding cover is arranged outside the periphery of the connecting portion of the base and forms the shielding space outside the periphery of the connecting portion and above the supporting portion; the piezoelectric element and the mass are arranged in the shielding space, which can further shield external signal interference, increase the shielding effect on the external signal, reduce the interference of the external signal with the piezoelectric element and ensure the measurement accuracy of the piezoelectric acceleration sensor.

BRIEF DESCRIPTION OF THE DRAWINGS

In order to more clearly explain the technical solutions according to embodiments of the disclosure, the drawings required in the embodiments of the disclosure will be briefly introduced as follows. Obviously, the drawings described below are only some embodiments of the disclosure. For those of ordinary skill in the art, without paying any creative work, other drawings can be obtained based on these drawings.

Figure 1:
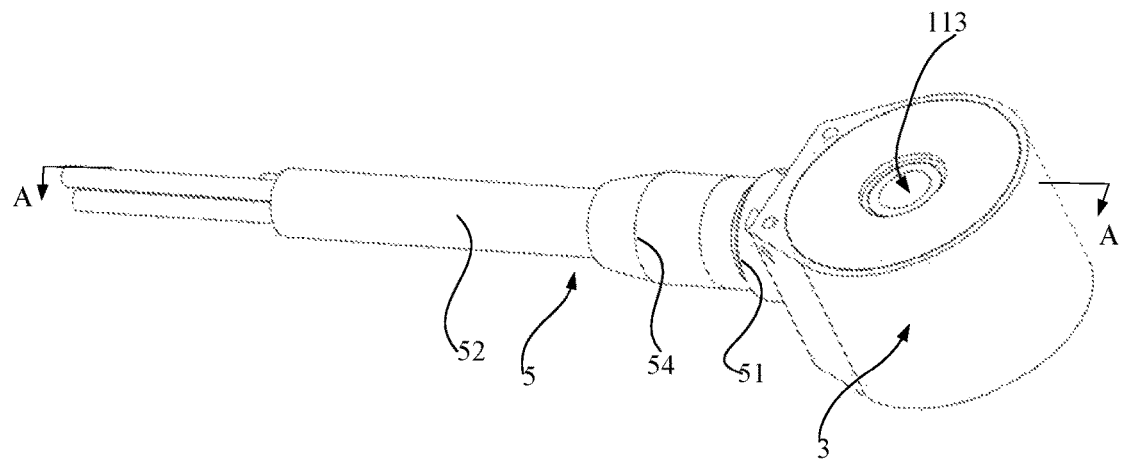
FIG. 1 is a structural schematic diagram of a piezoelectric acceleration sensor according to embodiments of the disclosure.

REFERENCE SIGNS IN THE DRAWINGS 1 charge output member;
11 base;
111 supporting portion;
112 connecting portion;
113 mounting hole;
12 piezoelectric element;
13 mass;
2 shielding cover;
21 shield;
22 shield support;
3 housing;
31 cylindrical body;
32 upper cover;
321 through hole;
4 insulating layer;
5 output assembly;
51 connector;
52 cable;
53 sleeve;
54 injection molded member;
6 circuit board.

DETAILED DESCRIPTION

Features in various aspects and exemplary embodiments of the disclosure are described in detail below. In the following detailed description, numerous specific details are set forth in order to help thorough understanding of the disclosure. However, it is obvious to those skilled in the art that the disclosure may be implemented without some of these specific details. The following descriptions of the embodiments are merely intended to provide better understanding of the disclosure by illustrating examples of the disclosure. The disclosure is not limited to any specific configuration and algorithm presented hereinafter; and any modification, replacement and improvement of elements, members and algorithms are covered in the scope of the disclosure without departing from the spirit of the disclosure. In the drawings and the following description, well-known structures and techniques are not illustrated to avoid unnecessarily obscuring the disclosure. For clarity, the dimensions of some of the structures may be exaggerated. Furthermore, the features, structures, or characteristics described hereinafter may be combined in any suitable manner in one or more embodiments.

The orientation words appearing in the following description are all directions shown in the drawings, which are not intended to limit the specific structure according to embodiments of the disclosure. In the description of the disclosure, it should also be noted that the terms "mount" and "connect" are to be understood broadly, maybe, for example, a fixed connection, a detachable connection, or an integral connection; they can be connected directly or indirectly. For those of ordinary skill in the art, the specific meanings of the above terms in the disclosure can be understood according to actual circumstance.

Figure 2:
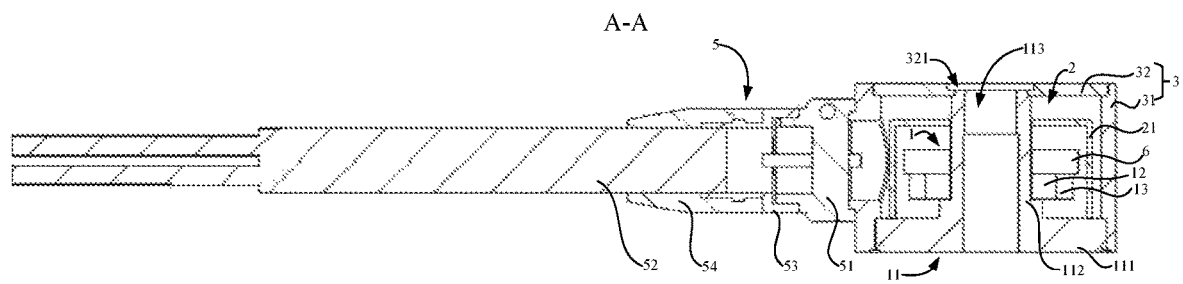
FIG. 2 is an A-A cross-section view of the piezoelectric acceleration sensor in as shown in FIG. 1.
Figure 3:
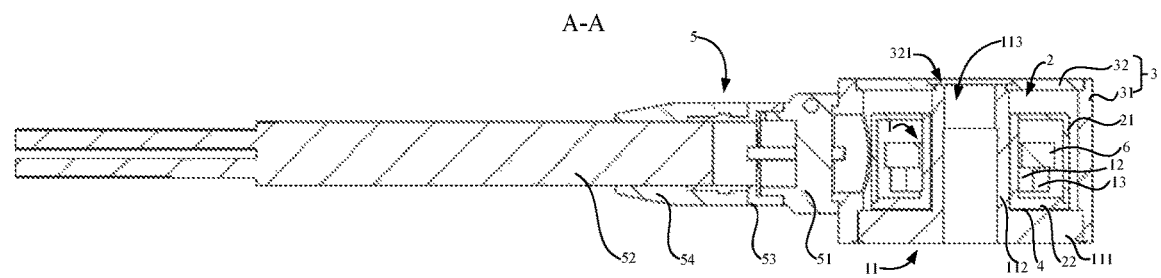
FIG. 3 is another A-A cross-section view of the piezoelectric acceleration sensor in as shown in FIG. 1.

For better understanding of the disclosure, a piezoelectric acceleration sensor according to the disclosure will be described below in detail with reference to FIG. 1 to FIG. 3. FIG. 1 is a structural schematic diagram of a piezoelectric acceleration sensor according to embodiments of the disclosure; FIG. 2 is an A-A cross-section view of the piezoelectric acceleration sensor in as shown in FIG. 1; and FIG. 3 is another A-A cross-section view of the piezoelectric acceleration sensor in as shown in FIG. 1.

Embodiments of the disclosure provide a piezoelectric acceleration sensor, which includes at least a charge output member 1, a shielding cover 2 and a housing 3.

The charge output member 1 includes a base 11, a piezoelectric element 12 disposed on the base 11 and a mass 13, wherein the base 11 includes a supporting portion 111 and a connecting portion 112 disposed on the supporting portion 111 and extending in a first direction (vertical direction as shown in the drawings), and the piezoelectric element 12 and the mass 13 are sleeved on the connecting portion 112. It can be understood that the piezoelectric element 12 is arranged between the connecting portion 112 and the mass 13. During the vibration, the mass 13 presses the piezoelectric element 12 so that the piezoelectric element 12 changes its polarization to generate an electrical signal.

The shielding cover 2 is sleeved on the connecting portion 112 of the base 11. The shielding cover 2 is connected to the connecting portion 112 and the supporting portion 111 of the base 11. The shielding cover 2 forms a shielding space outside a periphery of the connecting portion 112 and above the supporting portion 111. The piezoelectric element 12 and the mass 13 are arranged in the shielding space, which can prevent external signals from interfering with the piezoelectric element 12.

The housing 3 is coupled with the supporting portion 111 of the base 11. The housing 3 and the supporting portion 111 together form an accommodating space for accommodating the charge output member 1 and the shielding cover 2. The housing 3 can protect the charge output member 1 and the shielding cover 2 in the accommodating space, and can play a certain shielding role against external signals.

In the embodiments of the disclosure, the housing 3 is coupled with the supporting portion 111 of the base 11, and the housing 3 and the supporting portion 111 form the accommodating space, which can play a certain role in shielding external signals. The shielding cover 2 is arranged outside the periphery of the connecting portion 112 of the base 11 and forms the shielding space outside the periphery of the connecting portion 112 of the base 11 and above the supporting portion 111. The piezoelectric element 12 and the mass 13 are arranged in the shielding space, which can further shield external signal interference, increase the shielding effect on the external signal, reduce the interference of the external signal with the piezoelectric element 12 and ensure the measurement accuracy of the piezoelectric acceleration sensor.

In this embodiment, the base 11 of the charge output member 1 may be made of stainless steel or α+β titanium alloy, so that it has a good rigidity. The supporting portion 111 of the base 11 may have a disc shape, the connecting portion 112 may have a cylindrical shape on the supporting portion 111, and the supporting portion 111 and the connecting portion 112 are coaxially arranged. Alternatively, the connecting portion 112 and the supporting portion 111 may have other shapes as needed, which is not limited in the disclosure. In order to ensure the overall rigidity of the base 11, the supporting portion 111 and the connecting portion 112 of the base 11 are integrally formed. The piezoelectric element 12 may be a piezoelectric ceramic or a piezoelectric crystal. The mass 13 may be made of 316L stainless steel, which has strong corrosion resistance and heat resistance. The piezoelectric element 12 and the mass 13 may be bonded to each other by conductive adhesive.

In this embodiment, the housing 3 can be made of the same material as the base 11 and be connected to the supporting portion 111 of the base 11 by laser welding. A lower surface of the housing 3 is flush with a lower surface of the base 11, in order to ensure the flatness of the entire lower surface of the piezoelectric acceleration sensor and further ensure the stability of the piezoelectric acceleration sensor when it is connected to a surface of an object to be measured, which in turn can improve the measurement accuracy.

In some optional embodiments, referring to FIG. 2, the shielding cover 2 includes a shield 21. The shield 21 is connected to the connecting portion 112 and the supporting portion 111. The shield 21, a part of the connecting portion 112 and a part of the supporting portion 111 encloses and forms the above-mentioned shielding space. It can be understood that the shield 21 has a cylindrical shape with two opening ends and is sleeved on the periphery of the connecting portion 112. One of the opening ends is connected to an outer surface of the connecting portion 112, and the other opening end is connected to an outer surface of the supporting portion 111. The shield 21 and a part of the base 11 form the shielding space, which can reduce the area of the shielding cover 2 while ensuring the shielding effect and can reduce costs. Specifically, the shield 21 may be connected to the connecting portion 112 and the supporting portion 111 through a welding process such as laser welding.

In this embodiment, the piezoelectric element 12 may be sleeved on the connecting portion 112 of the base 11, and then the mass 13 may be sleeved on the periphery of the piezoelectric element 12 through conductive adhesive. Then, the shield 21 may be welded to the connecting portion 112 and the supporting portion 111, such that a shielding space surrounding the piezoelectric element 12 and the mass 13 is formed. Finally, the housing 3 may be coupled with the supporting portion 111 to form the piezoelectric acceleration sensor.

In other optional embodiments, as shown in FIG. 3, the shielding cover 2 includes a shield 21 and a shield support 22. The shield 21 is coupled with the shield support 22, and the shield 21 and the shield support 22 form a shielding space. The piezoelectric acceleration sensor according to the embodiment further includes an insulating layer 4, which is attached to and disposed on the periphery of the connecting portion 112 and the supporting portion 111. The shield support 22 is connected to the connecting portion 112 and the supporting portion 111 of the base 11 through the insulating layer 4. In the embodiment, the shield support 22 and the shield 21 form a shielding space, and the shield support 22 and the base 11 are insulated and separated by the insulating layer 4. Outside the piezoelectric element 12 and the mass 13, a first shielding space is formed by the shield support 22 and the shield 21, and a second shielding space is formed by the housing 3 and the base 11, such that a double shielding is provided to the piezoelectric element 12 to prevent interference from external signals.

In this embodiment, the shield support 22 may include a sleeve shaped portion that is sleeved on the connecting portion 112 and an extension portion arranged at one end of the sleeve shaped portion. The extension portion is arranged on the supporting portion 111. The shield 21 as a whole has a cylindrical shape with two opening ends, which is sleeved on the periphery of the connecting portion 112. One of the opening ends is connected to an end of the extension portion, and the other opening end is connected to an end of the sleeve shaped portion away from the extension portion, such that the shield 21 and the shield support 22 form a shielding space surrounding the connecting portion 112. The shield support 22 and the shield 21 can be connected by laser welding.

In this embodiment, the insulating layer 4 may be first attached to and arranged on the connecting portion 112 and the supporting portion 111 of the base 11, and then the shield support 22 is arranged outside the insulating layer 4, and the shield support 22 is sleeved on the piezoelectric element 12 and the mass 13. Then, the shield 21 and the shield support 22 are welded to form a shielding space, and finally the housing 3 is coupled with the support 111 to form the piezoelectric acceleration sensor.

In this embodiment, the insulating layer 4 has a size larger than or equal to a size of a portion of the shield support 22 that is connected to the connecting portion 112 and the supporting portion 111, so that the shield support 22 can be completely attached to the insulating layer 4, which thereby ensures the insulation between the shielding cover 2 and the base 11. It can be understood that a surface of the shield support 22 near the base 11 and the shape of the insulating layer 4 preferably conform to the shapes of outer surfaces of the connecting portion 112 and the supporting portion 111 such that the good connection between the shield support 22 and the base 11 through the insulating layer 4 can be ensured.

In any of the above embodiments, the piezoelectric acceleration sensor further includes an output assembly 5 which is disposed outside the housing 3 and is electrically connected to the charge output member 1 for transmitting an electrical signal from the charge output member 1 to external devices.

The output assembly 5 may include a connector 51 formed at a lateral side of the housing 3 and a cable 52 electrically connected to the connector 51. The piezoelectric acceleration sensor according to the embodiment includes the cable 52 and electrically connects the cable 52 to the internal charge output member through the connector 51, which can avoid the wiring connection in use and ensure the air tightness in the interior of the housing 3.

Furthermore, the connector 51 and the cable 52 are connected through a sleeve 53. The sleeve 53 has two opposite ends. The connector 51 is connected to one end of the sleeve 53, and the cable 52 is crimped onto the other end of the sleeve 53.

In some optional embodiments, an injection molded member 54 is disposed at an outer surface of the sleeve 53 onto which the cable 52 is crimped. The injection molded member 54 is disposed to surround a part of the sleeve 53 and a part of the cable 52. The injection molded part 54 can provide sealing and waterproofing at the crimped contact, and can provide insulation to prevent electric leakage at the crimped contact which otherwise may cause safety hazard.

In the above embodiments, the connector 51 and the housing 3 may be connected by laser welding to form an integral structure, or may be integrally manufactured to ensure the overall rigidity of the piezoelectric acceleration sensor according to the embodiment. The cable 52 may be a noise reducing cable to further reduce the interference of external signals with the output electrical signal.

In some optional embodiments, the piezoelectric acceleration sensor further includes a circuit board 6, which is disposed at a side of the piezoelectric element 12 away from the supporting portion 111 to surround the connecting portion 112. The circuit board 6 is arranged in the shielding space and is electrically connected to the piezoelectric element 12. The circuit board 6 can amplify the signal of the piezoelectric element 12 to facilitate detection. It can be understood that the shield 21 is provided with a via hole, so that a wire can pass through the via hole to electrically connect the circuit board 6 and the connector 51.

In some optional embodiments, a partition may also be disposed at an inner surface of the shielding cover 2 to support the circuit board 6 in order to prevent influence on the signal of the piezoelectric element 12 when the circuit board 6 is directly arranged on the piezoelectric element 12.

In any of the above embodiments, the base 11 further includes a mounting hole 113 that extends through the connecting portion 112 and the supporting portion 111 in the first direction. Through the mounting hole 113 and a bolt for matching with the mounting hole 113, the piezoelectric acceleration sensor according to the embodiment can be fixed on the object to be measured.

The housing 3 includes a cylindrical body 31 and an upper cover 32. The cylindrical body 31 is sleeved on the connecting portion 112 and snapped on the supporting portion 111. The upper cover 32 includes a through hole 321 extending through the upper cover 32. The through hole 321 is coaxial with the mounting hole 113 of the base 11. Moreover, the through hole 321 has a diameter larger than or equal to that of the mounting hole 113. The upper cover 32 is coupled at a side of the cylindrical body 31 and a side of the connecting portion 112 away from the supporting portion 111. The upper cover 32 may be fixed to the side of the cylindrical body 31 and the side of the connecting portion 112 away from the supporting portion 111 by laser welding. In order to prevent the welded portion from protruding from the surface of the upper cover 32, the through hole 321 may be a stepped hole, and the welding process may be performed at a step of the stepped hole to fix the upper cover 32 and the connecting portion 112.

In the piezoelectric acceleration sensor according to embodiments of the disclosure, the housing 3 has an outer diameter at its bottom of 19 mm to 22 mm, and a height of 12 mm to 14 mm, which is suitable for the detection of medium and high frequency signals.

Although the disclosure has been described with reference to the preferred embodiments, various modifications may be made to the disclosure and components may be replaced with equivalents without departing from the scope of the disclosure. In particular, the technical features mentioned in the various embodiments can be combined in any manner as long as there is no structural conflict. The disclosure is not limited to the specific embodiments disclosed herein, but comprises all technical solutions falling within the scope of the claims.

What is claimed is:

1. A piezoelectric acceleration sensor, comprising:
a charge output member comprising a base, a piezoelectric element disposed on the base and a mass, wherein the base comprises a supporting portion and a connecting portion disposed on the supporting portion and extending in a first direction, the piezoelectric element and the mass are sleeved on the connecting portion, and the supporting portion and the connecting portion are integrally formed;
a shielding cover sleeved on the connecting portion, wherein the shielding cover is directly connected to the connecting portion and the supporting portion, the shielding cover forms a shielding space outside a periphery of the connecting portion and above the supporting portion, and the piezoelectric element and the mass are arranged in the shielding space; and
a housing coupled with the supporting portion, wherein the housing and the supporting portion are directly connected to form an accommodating space for accommodating the charge output member and the shielding cover.

2. The piezoelectric acceleration sensor according to claim 1, wherein the shielding cover comprises a shield, wherein the shield is connected to the connecting portion and the supporting portion, and the shielding space is formed and enclosed by the shield, a part of the connecting portion and a part of the supporting portion.

3. The piezoelectric acceleration sensor according to claim 1, further comprising an insulating layer, which is attached to and disposed on the periphery of the connecting portion and the supporting portion;
the shielding cover comprises a shield and a shield support connected with each other to form the shielding space, the shield support is sleeved on the connecting portion, the shield support is connected to the connecting portion and the supporting portion through the insulating layer, and the shield is coupled with the shield support.

4. The piezoelectric acceleration sensor according to claim 3, wherein the insulating layer has a size larger than or equal to a size of a portion of the shield support that is connected to the connecting portion and the supporting portion, and the shield support is completely attached to the insulating layer.

5. The piezoelectric acceleration sensor according to claim 1, further comprising an output assembly, which is disposed outside the housing and is electrically connected to the charge output member, wherein the output assembly comprises a connector formed at a lateral side of the housing and a cable electrically connected to the connector.

6. The piezoelectric acceleration sensor according to claim 5, wherein the connector and the housing are integrally formed, and the cable is a noise reducing cable.

7. The piezoelectric acceleration sensor according to claim 5, wherein the connector and the cable are connected through a sleeve, the connector is connected to one end of the sleeve, and the cable is crimped onto the other end of the sleeve.

8. The piezoelectric acceleration sensor according to claim 7, wherein an injection molded member is disposed at an outer surface of the sleeve onto which the cable is crimped, and the injection molded member is disposed to surround a part of the sleeve and a part of the cable.

9. The piezoelectric acceleration sensor according to claim 1, further comprising a circuit board, which is disposed at a side of the piezoelectric element away from the supporting portion to surround the connecting portion, wherein the circuit board is arranged in the shielding space and is electrically connected to the piezoelectric element.

10. The piezoelectric acceleration sensor according to claim 1, wherein the base comprises a mounting hole that extends through the connecting portion and the supporting portion in the first direction.

11. The piezoelectric acceleration sensor according to claim 10, wherein the housing comprises a cylindrical body and an upper cover, the cylindrical body is sleeved on the connecting portion and coupled with the supporting portion, the upper cover comprises a through hole extending through the upper cover, the through hole is coaxial with the mounting hole, the through hole has a diameter larger than or equal to that of the mounting hole, and the upper cover is coupled at the cylindrical body and the connecting portion.

12. The piezoelectric acceleration sensor according to claim 11, wherein the through hole is a stepped hole.

13. The piezoelectric acceleration sensor according to claim 2, further comprising an insulating layer, which is attached to and disposed on the periphery of the connecting portion and the supporting portion;
the shielding cover comprises a shield and a shield support connected with each other to form the shielding space, the shield support is sleeved on the connecting portion, the shield support is connected to the connecting portion and the supporting portion through the insulating layer, and the shield is coupled with the shield support.

14. The piezoelectric acceleration sensor according to claim 13, wherein the insulating layer has a size larger than or equal to a size of a portion of the shield support that is connected to the connecting portion and the supporting portion, and the shield support is completely attached to the insulating layer.

15. The piezoelectric acceleration sensor according to claim 14, further comprising an output assembly, which is disposed outside the housing and is electrically connected to the charge output member, wherein the output assembly comprises a connector formed at a lateral side of the housing and a cable electrically connected to the connector.

16. The piezoelectric acceleration sensor according to claim 15, wherein the connector and the housing are integrally formed, and the cable is a noise reducing cable.

17. The piezoelectric acceleration sensor according to claim 16, wherein the connector and the cable are connected through a sleeve, the connector is connected to one end of the sleeve, and the cable is crimped onto the other end of the sleeve.

18. The piezoelectric acceleration sensor according to claim 17, wherein an injection molded member is disposed at an outer surface of the sleeve onto which the cable is crimped, and the injection molded member is disposed to surround a part of the sleeve and a part of the cable.

19. The piezoelectric acceleration sensor according to claim 1, wherein the shield cover is connected to the connecting portion and the supporting portion through a welding process.

20. The piezoelectric acceleration sensor according to claim 1, wherein the housing and the supporting portion are connected through a welding process.

* * * * *